(12) United States Patent
Talmola (10) Patent No.: US 9,767,060 B2
(45) Date of Patent: Sep. 19, 2017

(54) USB TYPE C TO MHL M1 DEAD BATTERY CHARGING

(71) Applicant: Nokia Technologies Oy, Espoo (FI)

(72) Inventor: Pekka Talmola, Turku (FI)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 14/469,037

(22) Filed: Aug. 26, 2014

(65) Prior Publication Data

US 2016/0062935 A1 Mar. 3, 2016

(51) Int. Cl.
*G06F 13/40* (2006.01)
*G06F 1/26* (2006.01)

(52) U.S. Cl.
CPC .......... *G06F 13/4027* (2013.01); *G06F 1/266* (2013.01); *G06F 13/4072* (2013.01)

(58) Field of Classification Search
CPC ... G06F 1/266; G06F 13/4027; G06F 13/4072
See application file for complete search history.

(56) References Cited

U.S. PATENT DOCUMENTS

| | | | |
|---|---|---|---|
| 2008/0231235 A1 | 9/2008 | Thijssen | |
| 2013/0191566 A1* | 7/2013 | Kaestner | G06F 13/426 710/104 |
| 2014/0178015 A1* | 6/2014 | Tong | G02B 6/4284 385/88 |
| 2015/0268688 A1* | 9/2015 | Leinonen | G05F 3/02 307/147 |
| 2015/0341013 A1* | 11/2015 | Vemula | H01L 23/66 333/17.3 |
| 2016/0253283 A1* | 9/2016 | Bowers | G06F 13/4221 |

FOREIGN PATENT DOCUMENTS

| | | | |
|---|---|---|---|
| EP | 2589206 A2 | 5/2013 | |
| WO | WO-2012003332 A2 | 1/2012 | |

* cited by examiner

*Primary Examiner* — Nimesh G Patel
(74) *Attorney, Agent, or Firm* — Mintz Levin Cohn Ferris Glovsky and Popeo, P.C.

(57) ABSTRACT

Methods and apparatus, including computer program products, are provided for cable, connectors, and/or other devices. In one aspect there is provided an apparatus. The apparatus may include a first interface configured to enable coupling to a universal serial bus device; a controller circuitry configured to at least determine an amount of current and/or voltage available at a mobile high-definition link device when coupled and adjust, based on the determined amount, a value of pull up circuitry coupled to the first interface; and a second interface configured to enable coupling to Mobile High-definition link device. Related apparatus, systems, methods, and articles are also described.

20 Claims, 4 Drawing Sheets

USB TYPE C TO MHL M1 DEAD BATTERY CHARGING

FIELD

The subject matter described herein relates to cables, connectors, and/or chargers

BACKGROUND

Physical connectors, such as the connector used with the Universal Serial Bus (USB), can be used to couple devices. USB standards may be used to define physical and electrical aspects of USB. Examples of those standards include the Universal Serial Bus 3.1 Specification and Universal Serial Bus 3.0 Specification, as well as any additions, revisions, and updates thereto. More recently, the USB Type-C connector has emerged as a USB-type connector having a relatively small size and being configured so that the USB Type-C connector can be coupled without regard to plug orientation and/or cable direction.

SUMMARY

Methods and apparatus, including computer program products, are provided for cable, connectors, and/or other devices.

In some example embodiments, there may be provided apparatus. The apparatus may include a first interface configured to enable coupling to a universal serial bus device; a controller circuitry configured to at least determine an amount of current and/or voltage available at a mobile high-definition link device when coupled and adjust, based on the determined amount, a value of pull up circuitry coupled to the first interface; and a second interface configured to enable coupling to the mobile high-definition link device.

In some variations, one or more of the features disclosed herein including the following features can optionally be included in any feasible combination. The pull up circuitry may include one or more pull up resistors coupled to a configuration control line of the first interface. The pull up circuitry may include a current source coupled to a configuration control line of the first interface. The controller circuitry may couple to a data line at the second interface to determine the amount of current and/or voltage available at the mobile high-definition link device. The controller circuitry may adjust the value to enable informing the universal serial bus device of the amount of current and/or voltage available at the mobile high-definition link device. The controller circuitry may determine the amount and may adjust the value, when a power source at the universal serial bus device is insufficient to power an alternative interface mode to provide mobile high-definition link protocol communication at the first interface. The first interface may include a universal serial bus device type c interface. The second interface may include a mobile high-definition link next interface. The pull up circuitry may further be coupled to a source of power at the second interface. The controller circuitry may further be configured to provide, via power delivery communications, to the first interface the determined amount of current and/or voltage available at the mobile high-definition link device.

In some example embodiments, there may be provided apparatus. The apparatus may include a first interface; a second interface configured to enable coupling the first interface; a controller circuitry configured to at least determine an amount of current and/or voltage available at a mobile high-definition link device and adjust, based on the determined amount, a value of pull up circuitry coupled to the second interface; and a third interface configured to enable coupling to the mobile high-definition link device.

In some variations, one or more of the features disclosed herein including the following features can optionally be included in any feasible combination. At least one of a universal serial bus device or a user equipment may include the first interface.

In some example embodiments, there may be provided apparatus. The apparatus may include a first interface configured to enable coupling to a universal serial bus device; a controller circuitry configured to at least determine an amount of current and/or voltage available at a mobile high-definition link device when coupled and adjust, based on the determined amount, a value of pull up circuitry coupled to the first interface; a second interface; and a third interface configured to enable coupling to the second interface.

In some variations, one or more of the features disclosed herein including the following features can optionally be included in any feasible combination. The mobile high-definition link device may include the third interface. The third interface may include a mobile high-definition link receptacle.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Although some of the examples disclosed herein refer to certain types of connectors and interfaces including universal serial bus (USB) and Mobile High-definition Link (MHL), other types of accessories and interfaces may be used as well in accordance with the subject matter disclosed herein. Moreover, although some of the examples show a certain pin out arrangement, other arrangements may be used as well.

The Mobile High-definition Link (MHL) interface is specified by one or more standards, such as MHL 3.0 and any subsequent revisions and updates thereto, to provide a mobile high-speed interface Prior versions of the MHL interface standard provided support for other interface types, such as USB Micro-B and HDMI (high-definition multimedia interface) Type A connectors. However, MHL may specify a dedicated MHL-only connector referred to as MHL Next M1 (or more simply the M1 connector). The M1 connector may be a symmetrical, flip-able multi-pin connector (for example, 32-pins), and the M1 connector may be configured to provide for example 6 high speed transition-minimized differential signaling (TMDS) lanes, dedicated USB 2.0 wires, ID wires, eCBUS wires, VBUS power, and/or GND returns.

While MHL is evolving, the USB interface has evolved as well to provide a Type C connector. The USB Type C connector may be implemented as a symmetrical, flip-able 24-pin connector having capability for 1×USB 2.0, 2×USB 3.1, 2×CC-line/VCON, VBUS and/or GND. In addition, the USB Type C connector may include two SBU (sideband use pins and/or reserved for future use) pins. The Type C specification may enable use of the Type C interface in an alternate interface mode. This alternate interface mode may be entered using certain power delivery (PD) communications. In this alternate interface mode, some of the Type C pins can be reassigned for non-USB protocols, enabling thus flexibility in the arrangement of the functionality of the Type C pins. This flexibility may enable the Type C connector to be used with, among other things, MHL. For example, a Type C device, such as a smartphone including a Type C connector, may be coupled via a cable to an MHL M1 device, such as a television, set top box, and the like.

Figure 1:
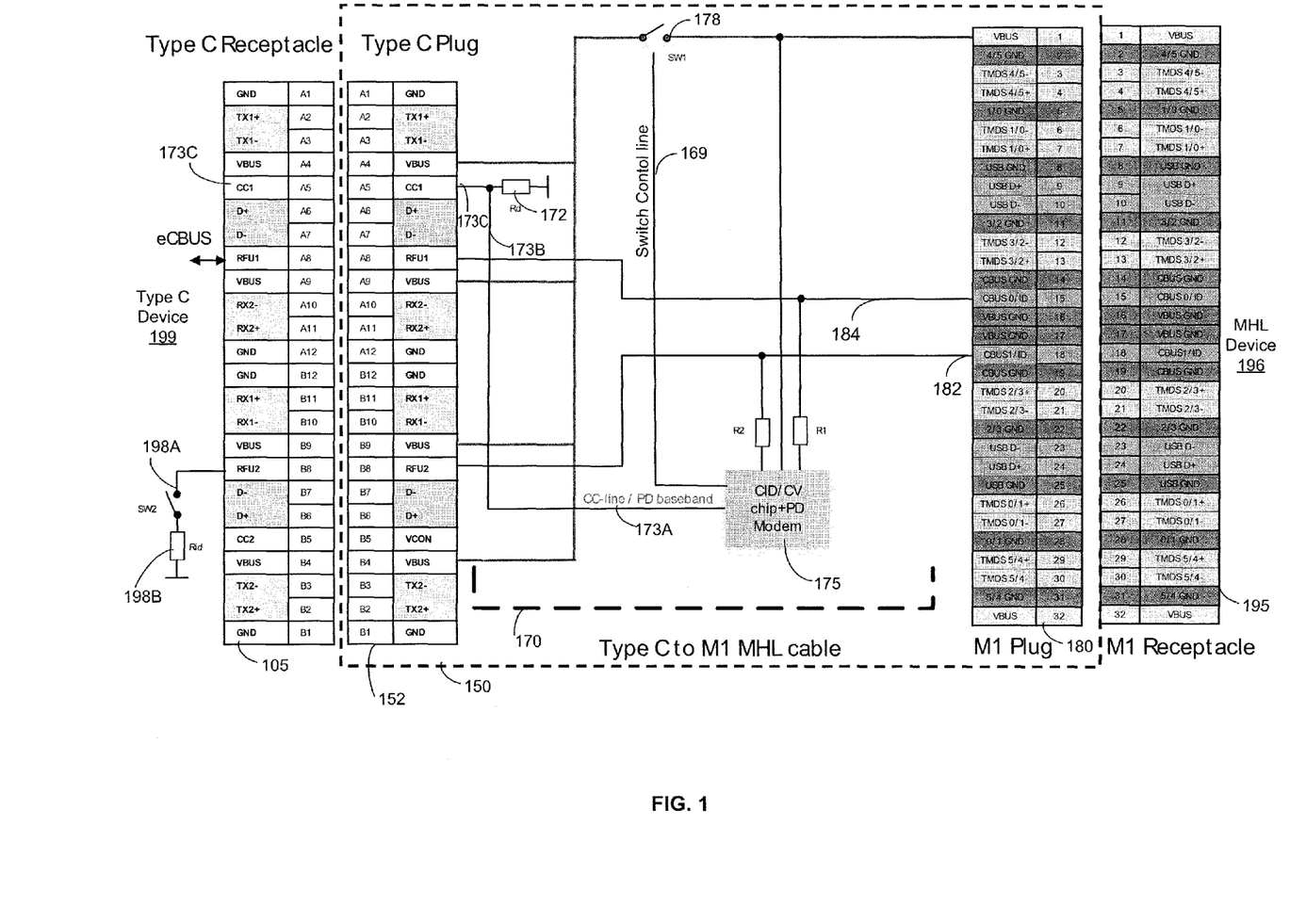
FIG. 1 depicts an example of a cable system for coupling USB Type C to MHL M1.

FIG. 1 depicts a system 100 including a USB Type C receptacle 105, a Type C to M1 MHL cable 150, and an M1 receptacle 195, in accordance with some example embodiments.

The USB Type C receptacle 105 may include one or more of the following pins: a power bus labeled (VBUS) for providing power, data pins (labeled SBU 1 and SBU 2), and/or configuration control (labeled CC1) pins, although other pin out arrangements and/or quantity of pins may be used as well. Moreover, the USB Type C receptacle 105 may be located at a device, such as a host device, and accessory device, a smartphone, and/or any other device.

Although FIG. 1 depicts USB Type C and MHL Next M1, other types of interfaces may be used as well. Moreover, FIG. 1 does not depict all of the pin out functionality of the Type C and/or MHL (for example, high speed data lanes shown are not shown as they are not necessary for the description of the subject matter disclosed herein).

The Type C to M1 MHL cable 150 (hereinafter the cable system 150) may further include Type C plug 152, cable circuitry 170, and an M1 plug 180.

The Type C plug 152 may couple to the Type C receptacle 105. Moreover, a portion of the pin outs of the Type C plug 152 may be similar to the pin out arrangement as the Type C receptacle 105 in order to allow the VBUS, SBU 1, SBU 2, CC1 and/or other pins to couple.

The cable circuitry 170 may include a controller chip, such as an identifier (ID)-chip 175. This ID-chip may be powered by the VBUS via switch 178 (labeled SW1), which can be opened or closed (although shown as open) under the control of ID chip 175 via control line 169.

The cable circuitry 170 may further include a pull down resistor 172 (Rd). When the cable system 150 couples to the Type C receptacle 105, the pull down resistor 172 may pull down the CC-line 173C to indicate to the Type C device that a valid connection has been made and/or that cable system 150 is a slave. Next, the ID chip 175 may initiate a USB power delivery (PD) communication protocol over the CC-line 173A-C. This PD communication protocol may occur in baseband over the CC-line in the order to place the Type C interface at host device 199 and receptacle 105 in the alternate interface mode, which may be configured to MHL to enable compatibility with MHL device 196.

When the Type C interface at host device 199/receptacle 105 are in the alternate interface mode, the Type C host device 199 may redefine the configuration of the pin outs in order to operate in an MHL state or mode in order to communication with for example MHL device 196. The host device 199 may also close switch 198A (labeled SWE2), so that the resistor 198B (labeled Rid) is connected to ground from one of the CBUS/ID lines 182. The closure of switch 198A (which couples the resistor 198B (labeled Rid) at the host 199 to the MHL plug's CBUS/ID line 182) may enable the MHL system to know the polarity or orientation of both plugs 152/180 in the cable system 150. The other ID/CBUS line 184 may be used for MHL eCBUS communications. Moreover, switch 178 (SW1) on the VBUS line may be closed, so the MHL sink 196 can act as power source and the Type C device can take in a charging current in accordance with for example the MHL Next and USB Type C specifications.

However, when the Type C device 199 has a depleted (for example, dead, weak, or the like) battery, the Type C device 199 has insufficient power to perform PD communications, making it difficult for the Type C device 199 to go into an alternate interface mode to provide MHL mode operations. The Type C device may, however, be capable of receiving power via the VBUS to charge its battery. But in order to do this, the Type C device may, according the USB Type C specification, need to provide pull down resistance (or current sink) in both CC-pins in the order to enable a Type C power source/charger (which in this case is cable system 170 and/or MHL device 196) to connect via the VBUS and start charging.

In the case of a depleted battery, cable system may need to function in part as a USB charger. As such, the cable system may provide a pull up resistor for the CC-line and may provide power to the VBUS-line(s). The cable system may thus operate as a so-called "USB dual-role device" capable of acting as both a USB host (for example, as a source of power, such as a charger) and a USB slave device. In the depleted battery case, the cable system may, in accordance with some example embodiments, operate in a host mode providing a charging current or voltage. In normal operation, cable system may operate as a host or a device accessory (or slave) as there are two dual-role USB devices connected together (i.e., the Type C device and the cable system), but when the PD communication transitions to the alternative interface mode of operation in MHL the distinction between USB host and device accessory is of little concern. Moreover, the USB host/device roles may be swapped using for example a PD command, such as SwapRoles.

In some example embodiments, the subject matter disclosed herein may provide a cable system that may couple two different interfaces, such as USB and MHL.

In some example embodiments, the cable system may couple a Type C device to an MHL device.

In some example embodiments, the cable system may include circuitry, such as a resistor, identification circuitry, and/or the like. In some example embodiments, the cable system circuitry may include an ID chip for indicating the charging capability information from a coupled MHL device and/or informing the charging capability information to the Type C device. In some example embodiments, the cable system may also include an adjustable resistor for adjusting charging current or voltage based on the charging capability information. The resistor may be located in a charger and/or in the cable system.

In some example embodiments, the cable system may operate even when the battery of the Type C device is depleted, although the cable system may be used at other times as well. For example, the cable system may be used when the Type C USB device does not have any MHL support.

Figure 2A:
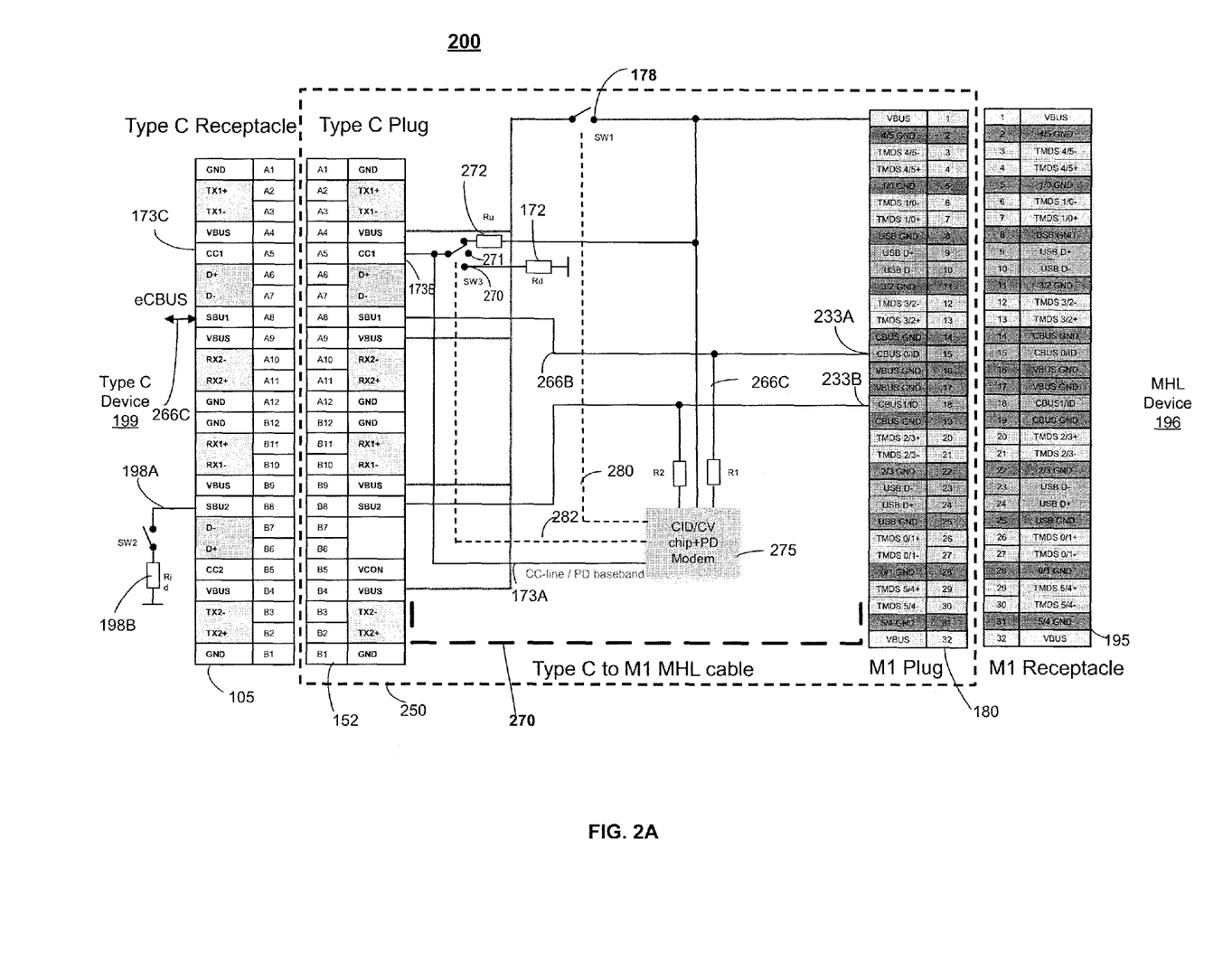
FIG. 2A depicts another example of a cable system for coupling USB Type C to MHL M1, in accordance with some exemplary embodiments.

FIG. 2A depicts a system 200 which may include a USB Type C receptacle 105, a Type C to M1 MHL cable 250 (cable system 250), and an M1 receptacle 195, in accordance with some example embodiments. The cable system 250 may further includes Type C plug 152, cable circuitry 270, and M1 plug 180, in accordance with some example embodiments.

Although cable system 250 is depicted as including two plugs, in some example embodiments, one or more of the plugs may be implemented in other ways as well. For example, plug 152 may be wired directly to the USB interface at device 199. Similarly, plug 180 may be wired directly to the MHL interface at device 196. Furthermore, plug 152 and/or plug 180 may be implemented as a receptacle as well.

Switch 270 may be configured to switch among one or more positions. In a first position, switch 270 may couple the configuration control (CC1) line 173B to the pull up resistor 272 to make the cable system operate as a host (for example, for providing power or charging). In a second position, switch 270 may couple the configuration control line 173B to the pull down resistor 270 to make the USB device the host. In a third position, the switch 270 may couple the configuration control line 173B to an open position to place the cable system in a neutral state (for example, in a neutral state there is no pull up resistor or pull down resistor coupled which effectively represents the cable system not being connected to the USB device 199). The third position leaves the CC-line disconnected to avoid connection of the CC line 173B until the cable system is powered via a connection to the MHL sink. Switch 270 may be controlled by control circuitry, such as ID chip 275, and this control may be via a control line 280. The ID chip may also control via line 280 switch 178 to couple power to the VBUS. In some example embodiments, the cable circuitry 270 including ID chip 275 may, as noted, control switch 270 to couple pull up resistor, Ru, 272 to configuration control (CC1) line 173B in order to support USB operation as well (for example, provide a certain resistance to enable device 199 to determine/read a resistance value representative of a current or voltage that can be provided for charging/power by cable system 250 and/or MHL device 196). Moreover, the pull up resistor, Ru, 272 may have a resistance value that is varied by cable circuitry 270 including ID chip 275, in accordance with some example embodiments. For example, ID chip 275 may, in accordance with some example embodiments, communicate via the MHL protocol and CBUS1/ID 233A or B with the MHL device 196 to determine how much current or power is available at the MHL device 196 for powering or charging the Type C device 199. Based on this determination, the ID chip 275 may then vary the value of the pull up resistor, Ru, 272, so that Type C device 199 can determine how much of a charge or voltage it can expect during charging with cable system 250 and MHL device 196. In this way, the cable system 250 may determine (via the MHL protocol) the amount of available charge or voltage at the MHL and inform, via the pull up resistor Ru 272, the Type C device of the available charge or voltage in order to initiate USB charging, in accordance with some example embodiments.

The value of pull up resistor, Ru, 272 may be used by cable system 250 (acting as a host device) to inform or advertise to coupled devices, such as Type C device 199, how much charging current can be drawn from the cable system 250. However, when the Type C device 199 has a depleted or weak battery, the Type C device 199 may still be in a USB operating mode, and as such, the Type C device 199 may not communicate in MHL mode directly with the MHL sink 196 to determine how much power the MHL sink 196 might be able to provide, but the ID chip may communication with the MHL sink 196 via the eCBUS 233A/B to obtain that information.

The Type C device 199 may, as noted, read or determine the value of the pull up resistor Ru 272, the value of which may be initatally configured according to a minimum current that can be handled by cable system 250 acting as a host device (for example, about 500 mA for USB2.0 devices, although other values may be used as well). The MHL sink 196 may have a much higher current available than this minimum current, but the Type C 199 cannot determine the higher amount of available charging current until it has sufficient power (via charging from the VBUS) to initiate PD communication to enter the alternate interface mode (which can be configured to provide an MHL mode). As such, Type C 199 charging may take place at a slower rate at the lower minimum current until Type C 199 enters alternate interface mode/MHL mode to determine whether the MHL sink 196 has a higher current available for charging.

In some example embodiments, the ID chip 275 may communicate with the MHL sink 196 over the eCBUS 233A or B, and this communication may query and/or determine how much current the MHL sink 196 can provide. In this example, the cable circuitry 250 including the ID chip 275 operate on behalf of the Type C device 199 (which may have a depleted battery) to query and/or determine how much current the MHL sink 196 can provide to the Type C device 199. Based on the result of this query/determination, ID chip 275 may then adjust the pull up resistor Ru 272 to a resistance value that represents the amount of current that can be provided by the MHL sink 196. The value of the pull up resistor Ru 272 may be predetermined by a standard to have the three current classes available depicted in Table 1.

| DFP Advertisement | Current Source to 1.7-5.5 V | Resistor pull-up to 4.75-5.5 V | Resistor pull-up to 3.3 V ± 5% |
|---|---|---|---|
| Default USB Power | 80 μA ± 20% | 56 kΩ ± 20% | 36 kΩ ± 20% |
| 1.5 A @ 5 V | 180 μA ± 5% | 22 kΩ ± 5% | 12 kΩ ± 5% |
| 3.0 A @ 5 V | 320 μA ± 5% | 10 kΩ ± 5% | 4.7 kΩ ± 5% |

In the example of Table 1, ID chip 275 may adjust the pull up resistor Ru 272 to for example 10 kilo-ohms when the current source (which in this case is MHL device 196) can provide 3 Amps, 22 kilo-ohms when the current source 196 can provide 1.5 Amps, and so forth. Although Table 1 depicts predetermined values specified by the Type C USB specification, other predetermined resistor values may be mapped to other current values as well. The ID chip 275 (or any other controller circuitry) may thus set the appropriate pull-up value, and the Type C device 199 may then draw current according to Table 1, which may enable a larger current and thus faster charging.

When the battery at Type C device 199 is charged to a level where the Type C device 199 can boot up and operate, ID chip 275 may start the PD communications and then engage in a power negotiation with the MHL sink to obtain an even a higher voltage or current than indicated in Table 1, if allowed or available by the MHL sink Although FIG. 2A depicts pull up resistor circuitry 270 as a single resistor, pull up resistor circuitry 270 may include a plurality of resistors which can be coupled to the CC1 line 173B by the ID chip 275 to provide a certain resistance value based on the voltage or current available at the MHL, in accordance with some example embodiments. The pull up resistor circuitry may be implemented with other circuit types as well. For example, a variable current source may be used. To illustrate further, the current may be controlled by the ID chip to represent an amount of current which corresponds to a certain resistance that maps to the voltage or current available at the MHL (for example, a D/A converter, in which the analog output voltage of the ID chip controls the current value that would equate to the certain resistance).

Figure 2B:
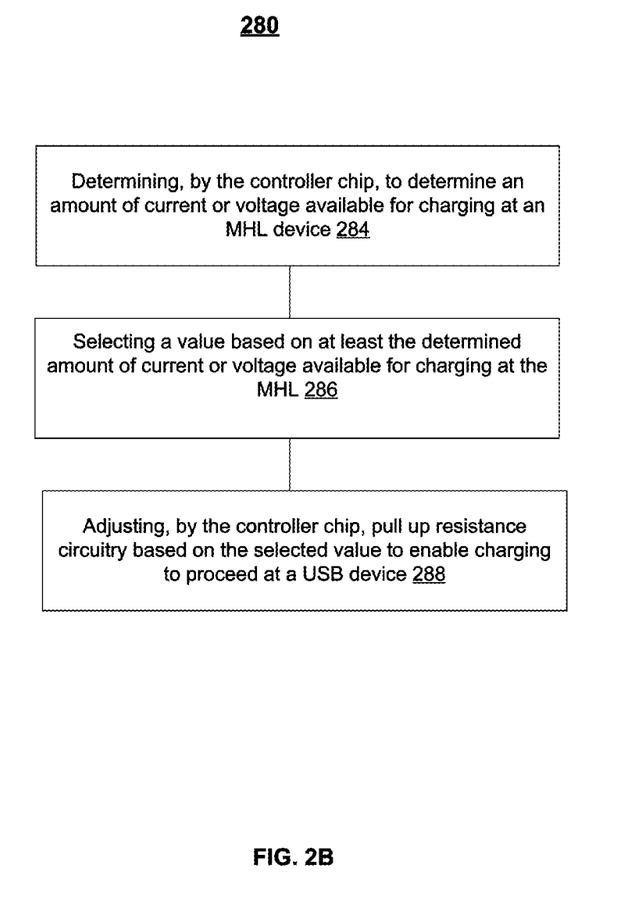
FIG. 2B depicts a process for interfacing USB Type C to MHL M1, in accordance with some exemplary embodiments.

FIG. 2B depicts a process 280 for interfacing USB Type C to MHL M1, in accordance with some exemplary embodiments. The description of FIG. 2B also refers to FIG. 2A.

At 284, a controller chip, such as ID chip 275, may determine an amount of current and/or voltage available at the MHL device 196 for charging the USB device 199, in accordance with some example embodiments. For example, the ID chip 275 may query via CBUS 233 A and/or B the MHL device 196 to determine the amount of current and/or voltage available at the MHL device 196. Moreover, this determination may be in accordance with the MHL protocol. In addition, this determination may be performed in order to support powering or charging USB device 199 (for example, when there is a depleted battery at USB device 199). For example, the controller chip may determine that the USB device has insufficient power (due to for example a depleted/weak battery by initiating communications with the Type C device. When there is no response, the controller chip may determine that the Type C device may have a deplete or weak battery (and/or does not support MHL), but in either case the controller chip may operate as a host and enable charging via process 280.

At 286, ID chip 275 may, based on the determined amount at 284, select a value for the pull up resistor circuitry at 272, in accordance with some example embodiments. For example, the determined amount at 284 may dictate a resistance selection as noted above with respect to Table 1, although other resistance values may be used.

At 288, the ID chip 275 may adjust pull up resistance circuitry based on the value selected at 286, in accordance with some example embodiments. For example, ID chip 275 may adjust the pull up resistor value to 22 kilo-ohms when the current source 196 can provide 1.5 Amps, although other adjustments may be used as well. If the resistance circuitry is implemented as current source circuitry, the adjustment may vary the current source circuitry based on the value selected at 286.

Figure 3:
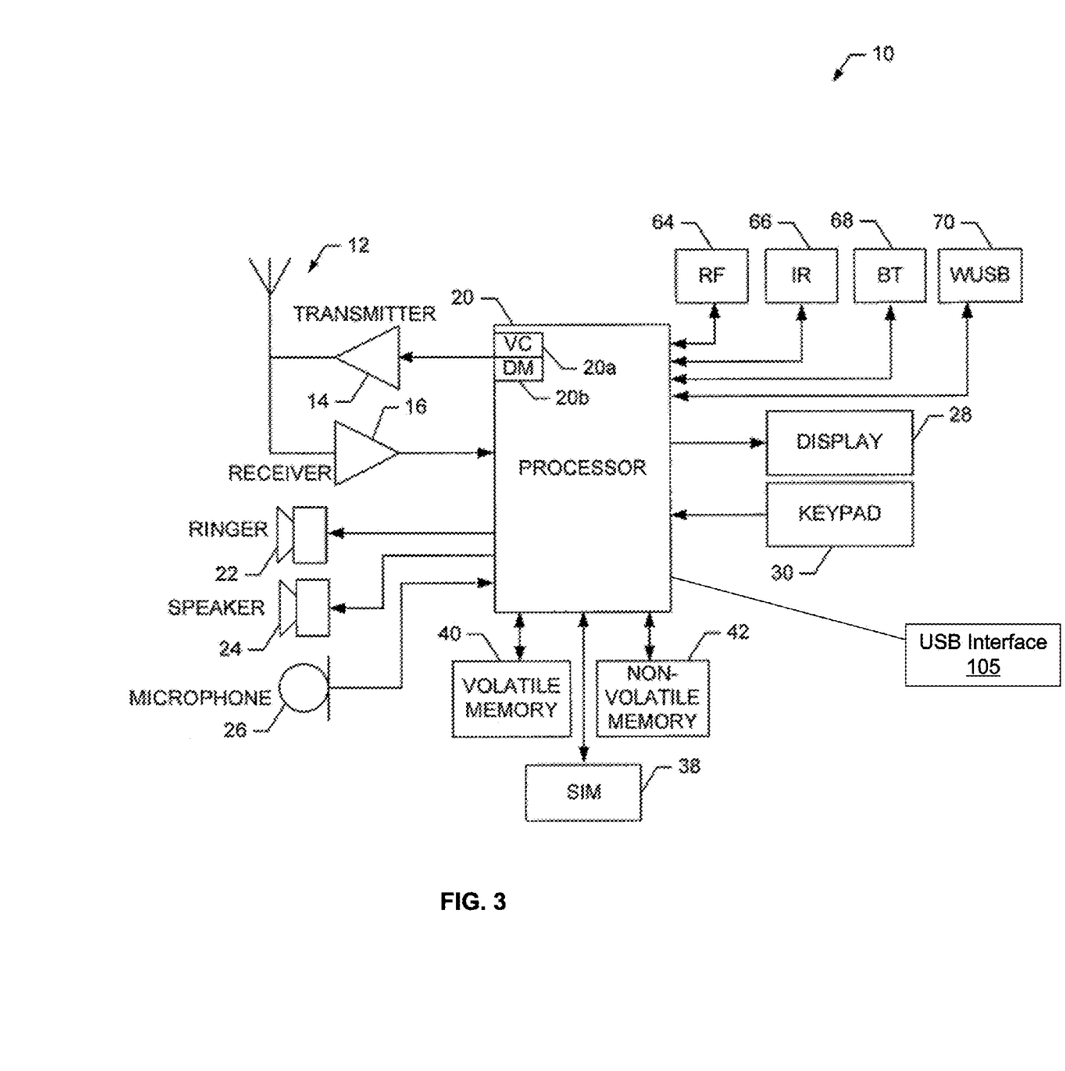
FIG. 3 depicts an example of an apparatus, in accordance with some exemplary embodiments.

FIG. 3 illustrates a block diagram of an apparatus 10, in accordance with some example embodiments. The apparatus 10 (or portions thereof) may be configured to provide for example device 199 and/or device 196.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWPAN, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for providing device 199, 196, and/or any other device (for example, the memory may provide a controller, such as chip 175 and/or 275. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to device 199, 196, and/or any other device (for example, the memory may provide a controller, such as chip 175 and/or 275.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is increasing the rate of charging and/or providing compatibility between different interfaces.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   a first interface configured to enable coupling to a universal serial bus device;
   pull up circuitry including one or more pull up resistors coupled to the first interface;
   a second interface configured to enable coupling to a mobile high-definition link device; and
   a controller circuitry configured to at least determine, when the second interface is coupled to the mobile high-definition link device, an amount of current and/or voltage available at the mobile high-definition link device,
   wherein the controller circuitry is further configured to adjust, based on the determined amount, at least one value of the one or more pull up resistors coupled to the first interface.

2. The apparatus of claim 1, wherein the one or more pull up resistors are coupled to a configuration control line of the first interface.

3. The apparatus of claim 1, wherein the pull up circuitry includes a current source coupled to a configuration control line of the first interface.

4. The apparatus of claim 1, wherein the controller circuitry couples to a data line at the second interface to determine the amount of current and/or voltage available at the mobile high-definition link device.

5. The apparatus of claim 1, wherein the controller circuitry adjusts the at least one value to inform the universal serial bus device of the amount of current and/or voltage available at the mobile high-definition link device.

6. The apparatus of claim 1, wherein the controller circuitry determines the amount and adjusts the at least one value, when a power source at the universal serial bus device is insufficient to power an alternative interface mode to provide mobile high-definition link protocol communication at the first interface.

7. The apparatus of claim 1, wherein the first interface comprises a universal serial bus device type c interface.

8. The apparatus of claim 1, wherein the second interface comprises a mobile high-definition link next interface.

9. The apparatus of claim 1, wherein the pull up circuitry is further coupled to a source of power at the second interface.

10. The apparatus of claim 1, wherein the controller circuitry is further configured to provide, via power delivery communications, to the first interface the determined amount of current and/or voltage available at the mobile high-definition link device.

11. A method comprising:
    determining, by a controller circuitry, an amount of current and/or voltage available at a mobile high-definition link device, when the mobile high-definition link device is coupled to a second interface; and
    adjusting, by the controller, at least one value of one or more pull up resistors coupled to a first interface configured to enable coupling to a universal serial bus device, wherein the adjusting is based on the determined amount, and wherein a pull up circuitry includes the one or more pull up resistors.

12. The method of claim 11, wherein the one or more pull up resistors are coupled to a configuration control line of the first interface.

13. The method of claim 11, wherein the pull up circuitry includes a current source coupled to a configuration control line of the first interface.

14. The method of claim 11, wherein the controller circuitry couples to a data line at the second interface to determine the amount of current and/or voltage available at the mobile high-definition link device.

15. The method of claim 11, wherein the controller circuitry adjusts the at least one value to inform the universal serial bus device of the amount of current and/or voltage available at the mobile high-definition link device.

16. The method of claim 11, wherein the controller circuitry determines the amount and adjusts the at least one value, when a power source at the universal serial bus device is insufficient to power an alternative interface mode to provide mobile high-definition link protocol communication at the first interface.

17. The method of claim 11, wherein the first interface comprises a universal serial bus device type c interface.

18. The method of claim 11, wherein the second interface comprises a mobile high-definition link next interface.

19. The method of claim 11, wherein the pull up circuitry is further coupled to a source of power at the second interface.

20. The method of claim 11, wherein the controller circuitry is further configured to provide, via power delivery communications, to the first interface the determined amount of current and/or voltage available at the mobile high-definition link device.

\* \* \* \* \*